United States Patent
Albertelli et al.

(10) Patent No.: US 12,202,189 B2
(45) Date of Patent: Jan. 21, 2025

(54) VACUUM FORMING PROCESS

(71) Applicants: Aldino Albertelli, Dublin (IE); Roberto Zedda, Dublin (IE)

(72) Inventors: Aldino Albertelli, Dublin (IE); Roberto Zedda, Dublin (IE)

(73) Assignee: Acell Industries Limited, Dublin (IE)

( * ) Notice: Subject to any disclaimer, the term of this patent is extended or adjusted under 35 U.S.C. 154(b) by 704 days.

(21) Appl. No.: 17/059,819

(22) PCT Filed: May 30, 2019

(86) PCT No.: PCT/GB2019/051469
§ 371 (c)(1),
(2) Date: Nov. 30, 2020

(87) PCT Pub. No.: WO2019/229435
PCT Pub. Date: Dec. 5, 2019

(65) Prior Publication Data
US 2021/0206047 A1 Jul. 8, 2021

(30) Foreign Application Priority Data
May 30, 2018 (GB) .................... 1808847

(51) Int. Cl.
*B29C 51/10* (2006.01)
*B29C 51/28* (2006.01)
*B29C 70/44* (2006.01)
*B29K 61/04* (2006.01)
*B29K 105/00* (2006.01)
*B29K 105/08* (2006.01)

(52) U.S. Cl.
CPC .............. *B29C 51/10* (2013.01); *B29C 51/28* (2013.01); *B29C 70/44* (2013.01); *B29K 2061/04* (2013.01); *B29K 2105/0014* (2013.01); *B29K 2105/0863* (2013.01)

(58) Field of Classification Search
CPC ......... B29C 51/10; B29C 51/28; B29C 70/44; B29C 33/405
See application file for complete search history.

(56) References Cited

U.S. PATENT DOCUMENTS

| | | |
|---|---|---|
| 3,950,477 A | 4/1976 | Di Giacomo |
| 4,098,856 A | 7/1978 | Rosenau |
| 4,312,829 A | 1/1982 | Fourcher |

(Continued)

FOREIGN PATENT DOCUMENTS

| | | |
|---|---|---|
| CN | 105440571 A | 3/2016 |
| EP | 0491630 A2 | 6/1992 |

(Continued)

OTHER PUBLICATIONS

Rotheiser, In-Mold Decorating—What are the options? Jul. 1, 2000. Online (Year: 2000).*

(Continued)

*Primary Examiner* — Christopher T Schatz
(74) *Attorney, Agent, or Firm* — Ryan T. Grace; Advent, LLP (57) ABSTRACT

The present invention relates to vacuum forming process for moulding a thermoset material and a start-up process for moulding a thermoset material. The present invention also relates to articles produced by the vacuum forming process.

14 Claims, 5 Drawing Sheets

(56) References Cited

U.S. PATENT DOCUMENTS

| | | | |
|---|---|---|---|
| 5,106,568 A | | 4/1992 | Honka |
| 5,131,834 A | * | 7/1992 | Potter .................... B29C 70/44 |
| | | | 425/389 |
| 5,242,652 A | * | 9/1993 | Savigny ................. B29C 43/12 |
| | | | 264/225 |
| 6,451,241 B1 | | 9/2002 | Ohliger et al. |
| 2003/0190452 A1 | * | 10/2003 | Lucas .................... B32B 27/04 |
| | | | 428/116 |
| 2007/0216064 A1 | | 9/2007 | Logan |
| 2010/0181018 A1 | | 7/2010 | Walczyk et al. |
| 2016/0151958 A1 | | 6/2016 | Houck |

FOREIGN PATENT DOCUMENTS

| | | |
|---|---|---|
| EP | 1792746 A1 | 6/2007 |
| GB | 762462 A | 11/1956 |
| WO | 20100138132 A1 | 12/2010 |
| WO | 2011065372 A1 | 6/2011 |
| WO | 20150158865 A1 | 10/2015 |

OTHER PUBLICATIONS

Notification of Transmittal of the International Search Report and the Written Opinion of the International Searching Authority, or the Declaration, dated Aug. 16, 2019 for PCT/GB2019/051469.
GB Search Report dated Nov. 30, 2018 for GB1808847.6.

* cited by examiner

VACUUM FORMING PROCESS

The present invention relates to vacuum forming process for moulding a thermoset material and a start-up process for moulding a thermoset material. The present invention also relates to articles produced by the vacuum forming process.

Conventionally, to form articles by moulding thermoset materials, the thermoset material is placed on a mould in a press, and is then pressed, usually with the application of heat, to form a moulded and cured article. Typically during a pressing step high pressures are applied to the thermoset material and pressures of 1000 to 1200 tonnes per $m^2$ are not unknown. Such presses are expensive and so there is a need for moulding processes requiring less capital expenditure.

By moulding using high pressures in a conventional press, it is possible to add surface patterns or shapes to a thermoset material during the moulding. Relatively large pressures are usually required to obtain good definition in such surface patterns and shapes. Such pressures place limitations on the materials that may be used in the mould, which can increase costs and impose limitations on the quality of the final product. Therefore, there is a need for alternative processes that can produce improved moulded thermoset materials effectively without the need for high pressures.

According to a first aspect of the present invention, there is provided a vacuum forming process for moulding a thermoset material, wherein the process comprises the following steps:

(i) providing a mould for moulding a sheet of thermoset material, wherein the mould comprises an elastomeric material;
(ii) placing a sheet of a phenolic thermoset material into contact with a surface of the mould;
(iii) applying a vacuum such that the sheet of thermoset material is forced against the surface of the mould, and such that the sheet of thermoset material is at least partially cured.

It has been surprisingly found that by using a mould comprising an elastomeric material with a phenolic thermoset material, and applying vacuum such that the sheet of thermoset material is forced against the surface of the mould, a moulded thermoset material may be produced at low expense and can show improved moulding detail compared to a conventional press.

In particular, by applying a vacuum such that the sheet of phenolic thermoset material is forced against the surface of the mould, the use of expensive pressing machinery can be avoided and capital expenditure can be reduced, whilst maintaining and even improving the quality of the moulded product. In addition, the flexible nature of the elastomeric mould allows the same mould to be used in combination with multiple different shaped templates, which avoids the need for an entirely new mould each time the shape or surface pattern needs to be changed.

Without wishing to be bound by any particular theory, it is believed that the mechanical properties of phenolic thermoset material specifically allows moulding of the material to be performed under lower pressures than may typically be used, for example for moulding conventionally used SMC (sheet moulding compound) materials. As a result, a mould comprising an elastomeric material may be used due to the lack of high pressures involved, and effective moulding can be performed by vacuum forming.

Furthermore, as a mould comprising an elastomeric material can be used, a moulded thermoset material may be easily produced having improved moulding detail relative to conventional techniques. For example, improved undercut in the moulding pattern may be obtained using a mould comprising an elastomeric material, where the mould may be deformed to some degree to allow release of the undercut from the mould. Surprisingly, by using an elastomeric mould, the level of detail on the moulded surface may be improved, which is thought to be at least in part a result of undercuts in the surface pattern, which are not normally possible with conventional moulds. To provide a moulded pattern with an undercut using conventional moulds such as aluminium or stainless steel moulds, such as are required in relatively high pressure moulding processes, specialised multi-part moulds may typically be used to allow removal of the moulded article form the mould, which adds significant expense to the process. It will also be appreciated that such multi-part moulds could not be used to improve surface detail on a moulded article.

It will be appreciated that high pressures used with conventional moulds and presses may be unsuitable for use with a mould comprising elastomeric material, as the elastomeric material may deform during pressing and lead to distortion of the moulded pattern. By combining a mould comprising an elastomeric material with a phenolic thermoset material and the step applying a vacuum to force the sheet of thermoset material against the surface of the mould, an effective and low-cost process is provided.

The thermoset material may include further components, for example components to enable the material to be handled in the form of a sheet.

The thermoset material may include any appropriate matrix composition. In preferred embodiments, the thermoset material comprises a thermosetting resin.

In some preferred embodiments, the thermoset material further comprises a polyester resin, a vinyl ester resin, an epoxy resin, or any combination thereof. For example, the phenolic thermoset material may be mixed with an amount of another resin prior to forming the thermoset material into a sheet.

The thermoset material may include melamine, which is useful as a fire retardant. The matrix materials may further include hardeners, accelerators, fillers, pigments, and/or any other components as required. The matrix may include a thermoplastic material.

With regard to the use of phenolic resins, the prior art (see for example U.S. Pat. Nos. 3,005,798, 3,663,503 and 4,369,259) teaches that in order to produce a phenolic resin with limited or reduced colour change, both a colour-stabilising agent and an acid catalyst must be present. Clearly, the requirement of both reactants will increase the costs of producing lighter coloured resins.

Furthermore, as shown in some of the above mentioned documents, the colour stabilising agent may be required to be added at a specific point in the reaction process (i.e. whilst the phenol resin is still in water-soluble form) in order to achieve the colour-stabilising effect throughout the resin formed. This creates a more complex reaction process, which will inevitably affect time efficiency and therefore, once again, cost efficiency of producing such resins.

In addition, many of the methods available for producing lighter coloured phenolic resins require the presence of strong acids or bases to catalyse the reaction process. It is known that the use of such chemicals causes corrosion of equipment which will therefore need to be replaced more frequently.

The thermoset material may include one or more release agents for aiding release of the thermoset material from the mould. Any suitable release agent may be used with the thermoset material according to the present invention. In preferred embodiments the release agent comprises a metal-fatty acid salt, for example a stearate salt. In preferred embodiments the release agent comprises zinc stearate, calcium stearate or magnesium stearate, preferably zinc stearate.

In accordance with the present invention, it is preferable for the phenolic thermoset material to comprise:
uncured phenolic resin;
filler;
a catalyst in an amount of less than 2 wt. % relative to the content of phenolic resin; and
wherein the filler is present in a ratio of filler to uncured phenolic resin in an amount of 2.5:1 and greater, and further wherein the filler comprises a transition metal hydroxide and/or aluminium hydroxide in a ratio of metal hydroxide to uncured phenolic resin in an amount of 1:1.5 to 3:1.

It has been surprisingly found that the addition of a metal hydroxide compound within the filler allows for the amount of catalyst present to be significantly reduced, and even possibly avoided altogether.

Without wishing to be bound by any particular theory, it is believed that the addition of the metal hydroxide compound allows for the uncured phenolic resin to achieve densification of the resin by reaction of the metal hydroxide with water, without the need for a catalyst to be present in any significant quantity, or even at all.

As referred to herein, densification refers to the resin reaching a state (similar to that of an equivalent B-stage curing) which allows for increased processability of such phenolic resins, for example, allowing them to be formed into sheets which may then be applied to a substrate and/or surface. The stability is such that the formed sheets can be formed into rolls for storage and later use. Such materials can then be fully cured by the application of heat and pressure.

As discussed above in some detail, a problem with the use of traditional catalysts is the discolouration of the cured resin produced, and therefore the ability to produce composites of different colour finishes and patterns. By use of the phenolic resin material disclosed herein, it is possible to reduce or even alleviate such issues as the amount of catalyst can be used, and in some embodiments avoided altogether.

Preferably, the amount of catalyst that is present may be less than 1 wt. % relative to the content of the phenolic resin, more preferably less than 0.5 wt. % relative to the content of the phenolic resin, such as less than 0.2 wt. %.

In some embodiments, the uncured material may be substantially free of catalyst. By substantially free, it is meant that the amount of any catalyst present is negligible in terms of the overall effect that it has on uncured material, and its ability to achieve densification of the resin.

For the avoidance of any doubt, the term catalyst is intended to refer to additives which are known to catalyse the curing of such phenolic resins, and are known to aid densification. Traditionally, such catalysts fall into two main categories, namely acidic and basic. Examples of acidic catalysts include, but are not limited to, one or more of hydrochloric acid, sulphuric acid and oxalic acid. Examples of basic catalysts include, but are not limited to, one or more of ammonia, sodium hydroxide, potassium hydroxide, lithium hydroxide, rubidium hydroxide, caesium hydroxide, barium hydroxide, calcium hydroxide and ethylamine.

It will also be appreciated that by reducing the presence of the catalyst material, or even avoiding its presence altogether, it is possible to avoid discolouration issues without the need to add colour-stabilising agents, for example, glyoxal, thiones, phosphinic acid salts, phosphonic acid salts such as described above.

In preferred embodiments, the thermoset material comprises one or more fillers. In preferred embodiments, the filler is present in a ratio of filler to uncured phenolic resin in an amount of 2.51 and greater. The filler may be present in an amount of 3:1 and greater, and preferably in an amount of 3.5:1 and greater. It will be appreciated that the amount of filler which is added is dependent, in some instances on the intended use of the composite being prepared. It will also be appreciated that there is a significant economic advantage in being able to increase the amount of filler whilst still being able to meet the stringent requirements for such composites, such as strength, modulus, fire resistance, weathering resistance etc. Accordingly, the amount of filler present may also be in an amount of 5:1 and greater where applicable.

Suitable fillers for use in the thermoset materials include particulate solids which are insoluble in the thermosetting material, such as filler selected from one or more of clays, clay minerals, talc, vermiculite, metal oxides, refractories, solid or hollow glass microspheres, fly ash, coal dust, wood flour, grain flour, nut shell flour, silica, ground plastics and resins in the form of powder, powdered reclaimed waste plastics, powdered resins, pigments, and starches.

In accordance with the thermoset materials described herein, the amount of filler may be present in an amount of 20:1 and less, such as in an amount of 10:1 and less.

The phenolic thermoset materials described herein are particularly concerned with phenol-formaldehyde resins.

In general, the fillers used in the thermoset materials described herein may be any particulate solid which is insoluble in the resin mixture.

As will be appreciated, it is preferable that the filler is inert to the rest of the thermoset material.

The fillers used may be organic or inorganic materials. For some embodiments, it is preferable for the filler to be an inorganic material.

Suitable fillers for use in the thermoset materials described herein may be selected from one or more of clays, clay minerals, talc, vermiculite, metal oxides, refractories, solid or hollow glass microspheres, fly ash, coal dust, wood flour, grain flour, nut shell flour, silica, ground plastics and resins in the form of powder, powdered reclaimed waste plastics, powdered resins, pigments, and starches.

As discussed above, it has been surprisingly found that the addition of a transition metal and/or aluminium hydroxide compound has the surprising effect of allowing the amount of catalyst to be greatly reduced and possibly avoided altogether.

Preferably, the transition metal or aluminium hydroxides are selected from compounds of formula $M(OH)_3$, wherein M is a metal.

Suitable metals (M) may be selected from one or more of scandium, vanadium, chromium, manganese, iron, cobalt and aluminium. In a preferred embodiment, the metal hydroxide is aluminium hydroxide.

In the materials described herein, the transition metal and/or aluminium hydroxide may be present in a ratio of metal hydroxide to uncured phenolic resin in an amount of 1:1.6 to 2.5:1, such as a ratio of metal hydroxide to uncured phenolic resin in an amount of 1:2 to 2:1.

In addition to the transition metal and/or aluminium hydroxide in the compositions described herein, the uncured phenolic material may further comprise ethylenediaminetetraacetic acid (EDTA). However, it is not in any way essential to the present inventions.

In preferred embodiments of the materials described herein, the fillers do not substantially comprise silicates and/or carbonates of alkali metals. This is due to the fact that solids having more than a slightly alkaline reaction, for example silicates and carbonates of alkali metals, are preferably avoided because of their tendency to react with acid hardeners. However, solids such as talc, which have a very mild alkaline reaction, in some cases because of contamination with more strongly alkaline materials such as magnesite, are acceptable for use as fillers.

As discussed above, the use of the transition metal and/or aluminium hydroxide compound allows for the amount of catalyst used to be reduced, or even avoided altogether. A significant benefit of this is that issues known in the art associated with discolouration can be avoided, thus allowing for the use of pigments which previously would not have been suitable, especially for commercial uses where finishes are of great importance.

It will also be understood that suitable colours may include white, yellow, pink, red, orange, green, blue, grey or purple. The reduction in catalyst and therefore the associated discolouration means that lighter colours may now be produced, for example, white, yellow, pink, red, orange, as well as light green, blue, grey and purple. The ability to produce finishes having such light colours greatly improves the commercial applications of such materials.

Phenolic resin materials such as described herein have significant advantages over more traditional materials such as SMC. It has been found that the phenolic resin material disclosed herein generally has the following advantages over SMC:

Better temperature performance and thermal shock resilience
   The phenolic materials of the present invention can be used to form brake pads, foundry moulds, aerospace heat shields etc.
Excellent resistance to chemicals, corrosives/solvents, oil and water/salt water (including acid rain)
   The phenolic materials of the present invention can be used to make laboratory countertops
Improved fire, smoke and toxicity performance
   The phenolic materials of the present invention can be used in mass transport and defence applications
improved anti-microbial properties
Harder, stronger, excellent dimensional stability
Electrical resistance
Good thermal insulation
Superior workability
Low temperature processing Moreover, as discussed, the phenolic thermoset materials allow for moulding using elastomeric moulds at low pressure.

The thermoset materials described herein may further comprise a viscosity controlling agent.

Suitable viscosity controlling agents may be selected from one or more of butanol, chloroform, ethanol, water, acetonitrile, hexane, and isopropyl alcohol. In a preferred embodiment, the viscosity controlling agent is water.

It will be appreciated that the amount of viscosity controlling agent used is dependent on the intended use of the uncured material. It is considered that the controlling of the viscosity is within the knowledge of the person of skill in the art.

The thermoset material may comprise reinforcement, for example reinforcing fibres. The thermoset material may include carbon fibres, glass fibres or aramid fibres.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular.

Fibres may provide a continuous filament winding. More than one layer of fibres may be provided. The fibres may be in the form of a layer. Where the fibres are in the form of a layer, they may be in the form a fabric, mat, felt or woven or other arrangement.

In an embodiment, the fibres may be selected from one or more of mineral fibres (such as finely chopped glass fibre and finely divided asbestos), chopped fibres, finely chopped natural or synthetic fibres, and ground plastics and resins in the form of fibres.

In addition, the fibres may be selected from one or more of carbon fibres, glass fibres, aramid fibres and/or polyethylene fibres, such as ultra-high molecular weight polyethylene (UHMWPE).

The thermoset material may include short fibres. The fibres may of a length of 5 cm or less.

Where present, the fibres may be added to the thermoset material in a ratio of resin to fibre of 6:1 to 1:3, such as a ratio of from 4:1 to 1:1.

The thermoset materials may be produced by mixing of the components as described above so as to form a generally homogeneous distribution of the components throughout the material. Any known method may be used to produce the general homogeneous distribution, such as high-shear mixing.

The length of time required to produce a generally homogeneous distribution of the components is dependent on, amongst other things, the amount of each component added, the viscosity of the components and the method of mixing used. In general, a substantially homogeneous distribution of the components can be formed within 5 minutes to 2 days, preferably within 10 minutes to 1 day, more preferably within 15 minutes to 10 hours.

The thermoset materials may have a thickness of from 0.3 to (for example 1 mm to 50 mm) to 50 mm, such as from 2 mm to 30 mm, or even 3 mm to 20 mm. Sheets of thickness 4 mm to 15 mm and 5 to 10 mm are also envisaged, as are sheets of 6 mm to 8 mm.

Alternatively or in addition to the presence of fibres in the thermoset material, reinforcement may be provided as a separate layer of fibres such as described above, for example arranged between the thermoset material and a substrate.

Where the separate layer of reinforcement is provided, it may be located across the whole of the substrate, or may for example be provided in only parts. For example, if there is a particular section of the product which is more susceptible to damage or attack, additional reinforcement can be provided in that region. For example, where the product is to be used in a door, additional reinforcement may be provided at regions of the door which are thinner than others for due to decorative moulding or other features and/or at regions of the door which are more susceptible to damage. Thus, reinforcement may be provided as one or more layers separate from the thermoset material. The additional layer of reinforcement may include short and/or long fibres, for example of materials mentioned above.

In preferred embodiments, the thermoset material substantially covers the entire area of the mould.

In accordance with the present invention, the mould comprises an elastomeric material.

In preferred embodiments, the elastomeric material comprises a natural or synthetic rubber.

Preferably the elastomeric material comprises silicone.

As discussed, by using a mould comprising an elastomeric material, a moulded thermoset material may be easily produced having improved moulding detail relative to conventional techniques when used in a vacuum forming process.

Without wishing to be bound by any particular theory, it is believed that the undercuts permitted by an elastomeric mould allow surface details to be produced that are not possible using conventional moulds. The overall effect is a moulded surface having a greater level of detail, for example a more realistic appearance where moulded surface is intended to replicate a natural surface such as brick, stone or wood.

The mould may have a specific shape such that the sheet of thermoset material is moulded into a specific shape on application of a vacuum. For example, the mould may be configured to provide a brick wall effect or other simulated surface effect onto the thermoset material.

In some embodiments, the mould is shaped so as to have an undercut. In particular, the mould may be shaped to provide at least some regions where undercut is present in the mould shape, where the mould may be deformed to some degree to allow release of the undercut product from the mould. In this way, a one-piece mould may be used for providing a product with at least some regions of undercut. Undercuts will also be understood to include small undercuts that are present as part of the surface detail applied by the mould. As discussed, this allows elastomeric moulds to produce moulded surfaces having improved surface detail.

It will be appreciated that a mould comprising elastomeric material will be at least partially flexible so as to allow the mould to adapt to various shapes. For example, the moulding may be performed over a shaped template such that the mould applies moulding to the thermoset material across a shaped surface. Preferably, the mould comprises a flexible sheet of elastomeric material that is able to conform to the shape of shaped templates whilst applying a moulded surface to the thermoset material.

It will also be understood that while the overall shape of the mould may conform to the shape of a template, the moulding detail that the mould is intended to apply to the thermoset material will be substantially unaffected. As a result, the same elastomeric mould may be applied to different shaped templates without alteration of the elastomeric mould, to produce materials having different overall shape but the same surface detail. This allows greater efficiency compared to conventional moulding processes, where an entirely new mould would need to be used in order to produce a different overall shape, regardless of the surface detail. It will also be appreciated that a simple shaped template may be produced relatively easily, whilst an entire new mould would be significantly more difficult and expensive. For example, if a foam material is used as a shaped template, this may be cut to shape relatively easily and cheaply.

Equally, different elastomeric moulds may be applied to the same shaped template, to produce moulded articles having the same overall shape but having different surface patterns.

In preferred embodiments, the entire moulding surface of the mould comprises the elastomeric material. For example, the mould as a whole may be formed from the elastomeric material.

In accordance with the present invention, the manner in which a vacuum is provided around the thermoset and mould is not particularly limited and could be provided in any suitable way such that the thermoset material is forced against the surface of the mould.

In some embodiments, the vacuum is created by use of a vacuum bag. A vacuum bag will be understood to include any flexible container within which the mould and thermoset material may be arranged and the volume within the bag subjected to evacuation to force the thermoset material and the mould together. The vacuum bag may comprise a flexible material in combination with a frame, or may simply be a flexible bag inside which the components are arranged.

In some embodiments, the vacuum is applied by means of a vacuum pump. However, it will be appreciated that any suitable means may be used for this purpose.

The level of vacuum may be any suitable pressure reduction. In preferred embodiments, the step of applying a vacuum comprises applying a pressure of at least 0.5 bar but less than 1 bar, for example from 0.7 bar to 0.9 bar.

It will be appreciated that the pressure with which the thermoset material and the mould are forced together by the vacuum will depend on the level of vacuum and the particular arrangement of the set-up. The pressure will nonetheless be substantially lower than is typically applied in a conventional press, where pressures of hundreds or even thousands of tonnes per $m^2$ may be used.

The pressure with which the thermoset material and the mould are forced together by the vacuum may be equivalent to 1 kg per $cm^2$ or less, preferably 0.5 kg per $cm^2$ or less, for example 0.4 kg per $cm^2$ or less. The pressure is preferably 0.1 kg per $cm^2$ or more, for example 0.2 kg per $cm^2$ or more.

According to the process of the present invention, the sheet of thermoset material is at least partially cured during the process.

It will be appreciated that curing of the thermoset material may be induced by any suitable method and will typically depend on the exact nature of the thermoset material.

For some thermoset materials, the application of vacuum, along with the pressure of forcing the thermoset material against the mould may induce at least partial curing of the thermoset material.

In preferred embodiments, the sheet of thermoset material is heated to a temperature of at least 50° C. In some embodiments the sheet of thermoset material is heated to a temperature of 100 to 200° C. In addition to inducing curing of the thermoset material, heating may improve the flow of the thermoset material, which may assist the bonding of the thermoset to a porous material, where present, and may also assist moulding of the thermoset material.

In some embodiments, the heating is conducted before the step of applying vacuum.

The process may comprise the step of heating the sheet of thermoset material before the step of applying vacuum. In this case, it will be appreciated that the heating and the length of time between the heating and the vacuum step should be such that the thermoset material has not fully cured and may be at least partially moulded during the vacuum step.

Preferably, the process may additionally or alternatively comprise heating the elastomeric mould material before the step of applying vacuum. In this way, during the vacuum step heat from the mould may be transferred to the thermoset material. Thus, while the heat to the mould may be provided before the vacuum step, the thermoset material may be heated indirectly by the mould during the vacuum step.

In some embodiments of the invention, the vacuum and heating occur simultaneously.

The process of the present invention may also comprise the step of providing a layer of porous material adjacent to the surface of the sheet of thermoset material that is not in contact with the mould.

It will be appreciated that during the vacuum step, the porous material will be forced against the thermoset material in the same manner as the thermoset material is forced against the mould.

In preferred embodiments, at least a part of the layer of porous material adheres to the sheet of thermoset material.

Preferably, at least a part of the layer of the porous material remains adhered to the sheet of thermoset material after the step of applying vacuum.

Preferably the thermoset material for use in the methods of the present invention is one that reduces in viscosity and/or at least partially liquefies on the application of heat and/or pressure. In this way, some flow of the material during the curing step can be achieved. Preferably, the thermoset material at least partly flows into pores or cells of the porous material during curing. Preferably the thermoset material and the porous material are such that the thermoset material only partly flows into the porous material during the curing process so that good bonding between the skin formed by the thermoset material and the porous material is obtained while retaining a suitable skin thickness for the required mechanical and other properties of the laminate.

Preferably, the layer of porous material substantially covers the sheet of thermoset material.

In some preferred embodiments, at least a part of the layer of porous material is profiled and/or shaped. In this way, the thermoset material can deform during the vacuum step such that the thermoset material follows the profile of the porous material. By using a mould comprising an elastomeric material, the mould may also adapt to the profile of the porous material, whilst still applying the shape or pattern to the surface of the thermoset material. In this way, the same elastomeric mould may be used with a variety of shaped materials, rather than a new mould being required for each different shape.

In preferred embodiments the porous material comprises a foam, preferably an open-celled foam. The use of such materials also allows for the possibility of drawing the vacuum through the foam, and thus the ability to pull the thermoset material tighter to the substrate. This in turn allows for more precise moulding of the thermoset material and/or improved bonding between the substrate and thermoset material.

Preferably, the porous material may be formed from phenolic or polyurethane resin. The resin may be foamed. Such foamed materials are known to the person of skill in the art.

In some preferred embodiments, the porous material is particulate in nature. Thus, the process may comprise the step of providing a substrate in particulate form and contacting the particulate substrate with a first surface of the thermoset material, such that when a vacuum is applied the thermoset material is pressed into the particulate substrate and a portion of the thermoset material flows into the particulate substrate.

In this way, the process may produce a polymeric skin that may comprise at least a portion of the particulate substrate material present on a surface of the skin; and optionally a particulate material is present on a second surface of the skin.

By using a particulate substrate, air and gas produced during the curing can pass through interstitial spaces between particles so that the risk of air and gasses leading to deformities in the product are reduced.

By particulate, it is meant that the substrate material is in the form of particles or granules. While particles of any suitable size may be used, in preferred examples of the invention the particles or granules have a diameter in the range of 0.05 mm to 50 mm; a diameter in the range of 0.05 mm to 10 mm, more preferably a diameter in the range of 0.05 mm to 2 mm.

Preferably the particulate substrate is such that gas or vapour can escape from the contact region in which the thermoset material and the mould are forced together in a direction having at least a component in a direction generally transverse to the direction in which the thermoset material is pressed to the substrate.

The particulate substrate comprises a plurality of interstitial spaces interstitial spaces such that the material of the thermoset material passes into the interstitial spaces of the substrate material during the vacuum step. Herein, references to 'interstitial spaces' means the spaces between the particles or grains of the material.

The density of the particulate substrate is such that the interstitial spaces are large enough to allow flow of gas and/or air from the contact region as discussed above.

The configuration of the particulate substrate is such that it can release pressure in the contact region. While substrates with interstitial spaces of any suitable size may be used, in some examples, the interstitial spaces are in the range of 0.5 mm to 5 mm in diameter, more preferably 0.5 or 1 mm to 2 or 3 mm in diameter.

Any suitable amount of particulate material may be used. In particular, an amount suitable to allow air and other gasses produced during curing to pass through the substrate interstitial spaces and prevent distortion of the cured polymeric skin. In a preferred embodiment of the invention an excess of particulate material is used. In some embodiments the substrate has a depth of 1 cm to 10 cm, preferably 3 cm to 6 cm.

In preferred embodiments of the invention the particulate substrate comprises a material selected from sand, gypsum, graphite, calcium carbonate, hydrated organic salts, ceramic materials, ground glass, ground stone, clay materials, metal oxides, powdered paints, and mixtures thereof. In a preferred embodiment of the invention the porous material is formed from sand.

It will be appreciated that the particulate substrate may also be used to form a finish to the formed skin. Such finishes produced may vary according to type and colour, and may be controlled by the use of the particulate materials used.

Pigments may be added to the particulate substrate material in order to control colour. By way of further example, ground glass can be used to form a desirable texture. Other material for example grits might be used on their own or in combination to obtain the desired effect. If stone or a material other than sandstone is to be simulated or a different effect is being obtained, the particulate might include other materials or mixtures of materials, for example carbon containing materials, graphite, clay, marble and/or coloured dust. The particulate may include a mixture of different coloured particulates which have been pre-sorted, or coloured. A colouring treatment may be applied to the particulates before the vacuum step, and/or could be applied after formation of the skin.

Alternatively, or in addition, the material may be coloured to give an attractive finish.

Different colours or textures of finish may be used as required. Where other effects are to be obtained, the particulate material may include other materials, for example grains having low or high hardness, angular or smooth shape, be of different sizes and/or of different natural colours. The particulates are preferably insoluble, but this might not be essential, for example where the resulting product is to be used in an internal application and not exposed to weathering. The particulates may comprise individual particles, or might comprise a powder, for example compressed to form granules.

Different coloured sands may be used to produce an attractive and realistic stone or brick effect; different coloured sands may be used to produce an attractive pattern. It will be understood that surface finishing effects may include, for example, brick, stone, marble, stucco, and slate.

In some preferred embodiments, instead of or in addition to the particulate materials, at least a part of the surface of the mould is coated with a dye, paint or ink, wherein the step of applying vacuum causes the dye, paint or ink to be applied onto the surface of the sheet of thermoset material.

In some examples, larger particles can be used. In some cases, gravel or pebbles can be embedded into the skin using methods described. Thus a "pebble dashed" effect can be achieved. For example, exterior skins for houses having a pebble dashed appearance can be formed.

The particulate substrate material generally becomes embedded in the thermoset material. Depending on the materials used and the manner of contacting the components together, the grains may extend from the surface of the thermoset material, or may be embedded or submerged in the surface.

The process of the present invention may further comprise the step of carrying out a surface treatment to increase exposure of the grains in the surface. The surface treatment may include removing surface material or thermoset material from around the grains.

The process may further include the step of sandblasting the surface containing the grains of surface material. The term sandblasting should preferably be understood to include any technique in which particles are propelled onto the surface to remove part of the thermoset material and thus to expose the grains in the surface. Any appropriate method may be used. The sand blasting may be carried out for example by air blasting sand particles at the surface.

Thus in examples the surface formed has a polymer matrix, but also includes particulate substrate material which gives a realistic look to a simulated surface.

Where a porous material is provided as described herein, the porous material may be heated before the step of applying vacuum.

Where the mould and/or a porous material are heated prior to the vacuum step, the mould or porous material may be heated to a temperature described above and then contacted with the thermoset material during the vacuum step, whereby the thermoset material is heated.

In one embodiment the porous material is heated via induction heating. In a separate embodiment the porous material is heated by irradiation with electromagnetic radiation.

By heating the porous material using induction or electromagnetic radiation, heating may readily be applied during the vacuum step without needing to apply heat through the seal of the equipment used to create the vacuum. For example providing heating through a vacuum bag will be less efficient and may damage the bag. It will also be appreciated that heating equipment would not need to be provided inside the area where the vacuum is created, which may require components such as wires to pass through to an area at atmospheric pressure, making the vacuum step less efficient.

Preferably the electromagnetic radiation comprises radiation with a frequency of from 300 MHz to 300 GHz, preferably from 300 MHz to 30 GHz, more preferably from 300 MHz to 3 GHz. In a preferred embodiment of the present invention, the electromagnetic radiation comprises radiation with a frequency of from 800 MHz to 1000 MHz, preferably from 902 MHz to 928 MHz. In an alternative preferred embodiment of the present invention, the electromagnetic radiation comprises radiation with a frequency of from 2.2 GHz to 2.7 GHz, preferably from 2.4 GHz to 2.5 GHz.

Preferably the porous material is irradiated with electromagnetic radiation with a power of at least 500 W, more preferably at least 700 W, for example at least 800 W. Any suitable power may be used for the irradiation and it will be understood that industrial irradiation systems with much higher power output may be used depending on the specific application. For example the power of the irradiation system may be at least 100 kW or at least 1 MW.

The irradiation may be conducted by any method known in the art. In some embodiments, where the electromagnetic radiation includes microwave radiation, the irradiation is conducted by means of a microwave oven, although other methods of emitting electromagnetic radiation may also be used.

According to a preferred embodiment the irradiation of the particulate substrate is conducted for a time period of from 30 seconds to 6 minutes. Irradiation of the substrate with electromagnetic radiation allows the particulate substrate to be heated rapidly throughout its structure. Therefore, the step of curing the thermoset material may be conducted more rapidly than with a traditional heated press, increasing productivity and minimising damage to sensitive components.

The porous material may be heated to any suitable temperature such that the curing of the thermoset material is commenced. Preferably, the substrate is heated to a temperature of at least 50° C., for example from 100° C. to 250° C., preferably from 120° C. to 200° C.

After irradiation and resultant heating of the porous material to a temperature such that the curing of the thermoset material is commenced, the particulate substrate may cool slowly to the extent that the curing of the thermoset material continues after the period of time in which the porous material is irradiated. Therefore, in a preferred embodiment, the thermoset material is allowed to cure for at least 3 minutes after the irradiation of the particulate substrate is completed.

Providing heating by irradiation of the porous material and not of the thermoset material is advantageous for at least the following reasons. Firstly, as the thermoset material forms a skin with an exposed surface, including magnetic susceptor materials in the thermoset material will change the appearance of the thermoset material and produce an inferior product. Secondly, volatile compounds may be produced in both the manufacture of the substrate and from the curing of the thermoset material. Such volatile compounds are undesirable in the final product as they may have associated health risks and such compounds are also likely to be flammable. Heating the porous material has the advantage of removing such impurities from the substrate, wherein the volatile compounds may be vaporised and pass out of the substrate through its pores or interstitial spaces, rather than collecting in the pores or interstitial spaces.

According to a preferred embodiment, the porous material comprises one or more electromagnetic susceptor materials. In some embodiments, the particulate substrate comprises more than one electromagnetic susceptor materials. For the purposes of the present invention, an electromagnetic susceptor material is considered to be a material which is increased in temperature upon irradiation with electromagnetic radiation. In a preferred embodiment, the electromagnetic susceptor material is a microwave susceptor material, wherein the term microwave is considered to include electromagnetic radiation with a frequency of from 300 MHz to 300 GHz.

The one or more electromagnetic susceptor materials will preferably be added as a filler to the porous material.

Electromagnetic or microwave susceptor materials may comprise any such materials commonly known in the art. Preferably, the electromagnetic or microwave susceptor material comprises one or more of graphite, carbon black, metals, metal oxides, hydrated inorganic salts or compounds, hydrated organic salts or compounds, water, or ceramic materials. The hydrated inorganic salts or compounds may comprise one or more of hydrated sulfates, hydrated phosphates, hydrated zeolites, or hydrated silicates. The hydrated inorganic salt or compound preferably comprises gypsum or clay minerals. In a particularly preferred embodiment, the electromagnetic or microwave susceptor material comprises graphite or gypsum.

In some embodiments, the properties of the substrate may be tailored by adjusting the ratio of the different electromagnetic susceptor materials present in the particulate substrate or the overall amount of electromagnetic susceptor materials in the substrate. For example the precise rate and magnitude of the heating of the particulate substrate may be adjusted in this way.

In some embodiments, the vacuum step is conducted after irradiation the substrate. In other embodiments, the vacuum step is conducted at the same time as the irradiation of the substrate and the curing of the thermoset material.

The method of the present invention may further comprise the step of providing one or more masonry tiles, the masonry tiles preferably being applied to the thermoset material prior to the vacuum step.

The use of such masonry tiles allows for the production of products having a brick, concrete, stone, tile or glass surface.

Structures formed from masonry are traditionally constructed from masonry blocks which are generally laid in and bound together by mortar, in some cases with steel reinforcement. Such structures are generally highly durable, resistant to weathering, have good weight-bearing properties, and are also visually appealing, making masonry a widely-used construction material. However, masonry does have the disadvantages that masonry blocks are heavy, time-consuming to install, and can be extremely costly. Particularly in the case of stone blocks, such as granite or marble, only a small portion of the costly stone is visible in use, making the use of entire blocks of such stone types unnecessary and economically prohibitive. Furthermore, traditional masonry construction techniques do not have the architectural flexibility that is found with more modern construction techniques, such as steel or concrete frame buildings. For instance, masonry construction techniques are generally unsuited to the construction of very tall buildings due to the weight of the masonry blocks. More recently, there are also difficulties in obtaining suitable supplies of masonry products, even allowing for increased expense.

There have been various efforts in the art to develop construction techniques which overcome the disadvantages of traditional masonry techniques, whilst maintaining the visual appeal and durability of traditional masonry in the completed structures. Generally, these techniques involve some kind of masonry cladding or siding. The terms "cladding" and "siding" are used herein to refer to the application of a non-structural layer of masonry to a pre-existing structure, such as a wall or building, usually to imitate the appearance of a traditional masonry structure. The masonry layer is generally substantially thinner than traditional masonry building blocks, being required only for visual and non-structural purposes. Thus, siding materials often take the form of a tile or slip having the surface dimensions of a brick or stone block on the visible surface, but which are typically only 10 to 30 mm in depth.

Siding materials may be applied to structures by being embedded in a layer of mortar coating the surface of the structure, sometimes with the use of metallic or plastic guide rails, which are used to maintain even spacing of the siding materials, for example brick slips. Another technique involves the use of metallic ties or clips which tie the siding materials to the underlying structure and which also transfer the weight of the siding materials to the building structure. Often metallic ties or clips and mortar are used in combination. Usually a pointing substance is subsequently disposed in the spaces between the siding materials to complete the illusion of a traditional masonry structure.

The use of siding materials, whilst having some advantages over traditional masonry construction techniques, nonetheless has the disadvantage that the installation of large numbers of separate siding tiles remains comparatively times consuming, particularly where the materials still require pointing.

The present invention provides the particular advantage of being to produce siding materials where the masonry tile and grouting can be formed in situ, and at the same time during the vacuum step. Such a process significantly reduces the duration for formation of siding panels, and indeed the duration of construction projects.

As used herein, the term "masonry tile" is intended to refer to a tile formed, at least in part, from concrete, clay, natural stone, artificial stone, ceramic, glass, or a combination thereof.

For example, the masonry tile may be formed from brick, marble, granite, limestone, travertine, sandstone, slate, cast stone, porcelain, earthenware, glass, or other similar materials, or a combination thereof. For the avoidance of doubt, as used herein, the term masonry tile should not be interpreted to include wood.

Where the masonry tile is formed from a porous material such as clay, porcelain or earthenware, it may be at least partially glazed. For example, the visible surface may be glazed, with the surface that contacts the thermoset material remaining unglazed. As will be appreciated by persons of skill in the art, an unglazed surface provides a better surface for attachment to the thermoset material and is therefore preferable to form a strong bond.

The depth of the masonry tile is preferably less than 30 mm, more preferably less than 20 mm, and still more preferably less than 15 mm. Generally, a depth of at least 5 mm is preferred for reasons of durability, although with smaller masonry tiles the depth may be less than 5 mm, for example from 2 to 5 mm, e.g. 3 mm or 4 mm.

Suitably, the masonry tile has a depth in the range of from 3 to 30 mm, more preferably 3 to 15 mm, for example 5 to 15 mm, or 5 to 10 mm.

Generally, the surface area of the masonry tile will not be greater than about 500 mm by 500 mm. However, the exact size of the masonry tile depends on the type of material used to form the masonry tile and the desired visual effect of the composite product. For instance, where the composite product is intended to look like a brick wall, the masonry tiles advantageously have a surface area of from about 190 to about 250 mm by about 55 to about 75 mm to simulate the dimensions of a major side face of a standard building brick.

Alternatively, the masonry tile may have a surface area of from about 95 to about 125 mm by about 55 to about 75 mm to simulate the dimensions of an end face of a standard building brick. For example, the masonry tile could be cut from a standard building block, such as a standard building brick. Alternatively, the masonry tile could be a brick slip of the type known in the art.

In the United Kingdom a standard size building brick generally has a major side face of about 65 mm by about 215 mm and an end face of about 65 mm by about 102.5 mm. In the United States a standard size building brick generally has a major side face of about 57 mm by about 203 mm and an end face of about 57 mm by about 102.5 mm.

Where the composite product is intended to look like a stone wall, a larger masonry tile size may be appropriate.

The surface of the masonry tile that contacts the thermoset material may be provided with surface indentations, pores or protrusions to form a key to ensure a strong bond is formed between the thermoset material and the masonry tile. For example, a series of parallel or crossed grooves may be provided. In some cases, however, the masonry material may have a sufficiently coarse structure that the provision of surface indentations or protrusions is unnecessary for a strong bond to be formed between the thermoset material and the masonry tile.

The masonry tile may extend over substantially all or only a part of the thermoset material and/or the substrate area. Preferably, a plurality of masonry tiles is provided which collectively extend over substantially all or only a part of the thermoset material. In this way, the plurality of masonry tiles may be rigidly bonded onto the surface of the thermoset material in any desired arrangement. For example, the plurality of masonry tiles may desirably arranged so as to imitate the arrangement of masonry building blocks found in traditional masonry construction techniques, for example the traditional brickwork bonds (e.g. Flemish bond, stretcher bond, English bond, header bond, herringbone bond and basket bond).

Optionally, the plurality of masonry tiles may be spaced apart and a rendering or grouting provided by the particulate substrate in the spaces between the masonry tiles to simulate the appearance of bricks bonded together by mortar, or a tiled wall or floor.

Alternatively, a particulate material, such as sand, powdered brick, powdered stone or powdered ceramic, may be pressed into the thermoset material in the spaces between the masonry tiles to simulate the appearance of render or grout. Preferably, the particulate material is pressed into the thermoset material simultaneously with pressing of the masonry tile, the thermoset material and optionally another porous substrate to form the skin.

In some embodiments, the method of the present invention may further include a step of contacting a surface material in particulate form with a second surface of the thermoset material.

In a preferred embodiment, the mould may be in the form of a template, such as a template defining a pattern to be formed by the masonry tiles. Such a template may be used to help position the masonry tiles when forming a skin.

The template may also be used to control the profile of the thermoset material between the masonry tiles. For the avoidance of doubt, the template can be used to control the depth of the skin in the area between the masonry tiles. Such control allows the position of the grout or render between the masonry tiles to be controlled.

In certain countries, it is known for the grout or render to be lower than the upper surface of the masonry (i.e. the grout or render is sunken compared to the masonry).

In other countries, it is preferred for the grout or render to be at a height similar to that of the upper surface of the masonry.

It will also be appreciated that the use of a mould template enables the present invention to be used to produce a range of different styles in situ without needing complicated mould systems or multiple processes.

The mould template, in use, may also result in a set of channels in the back surface of the cured skin. Such channels may be particularly beneficial with respect to allowing the flow of air behind the skin once installed.

The method may include a step of providing further components, such as between the mould and the thermoset material.

The method further includes the step of providing a veil on a second surface of the thermoset material. In one embodiment the veil is provided between the thermoset material and a surface of the mould. Preferably the veil comprises a sheet of material which is provided between the thermoset material and the mould surface before the vacuums step. The provision of the veil preferably gives rise to improvements or changes in the surface finish of the moulded article compared with an arrangement in which the veil is not present.

The veil is preferably substantially pervious to a component of the thermoset material during the vacuum step. In this way, a component, for example a resin component, of the thermoset material can pass through the veil during moulding so that a resin finish at the surface of the cured product can be formed. Therefore, the material for the veil is preferably chosen so that it is sufficiently pervious to certain components of the thermoset material (in particular the resin), while providing a barrier function for certain other components for example glass fibres or other reinforcements.

In some arrangements the veil can be placed directly adjacent to the mould surface and there will be sufficient penetration by resin components for a satisfactory surface finish to be produced.

The veil may comprise a non-woven material. In particular where the veil is applied directly to the mould, it may be desired for the veil material not to have a particular texture or finish, which might form a perceptible surface structure at the surface of the moulded product. However, in other arrangements, such a surface structure or pattern at the surface may be an advantageous feature.

Where such a structure is not desired, preferably the veil comprises a non-woven material. For example, preferably the veil does not comprise a knitted or woven surface, although in some cases such a material could be used, in particular if a surface treatment had been provided to reduce the surface structure of the veil material. For example, in some arrangements, the veil might comprise a fleece or brushed surface. In some arrangements, the veil may comprise a surface pattern which can be seen through the cured skin product. However, for most applications, preferably at least one surface of the veil material has substantially no surface structure or pattern.

The veil may comprise a felt cloth. For example the veil may comprise a polyester material. Alternative materials could be used, for example comprising wool, polyethylene, polypropylene or PET. The veil might comprise a fleece material, or might comprise a foam material. As indicated above, a suitable material preferably is pervious to the resin to be used, and has a suitable surface texture. The veil may comprise a polyester material, having a weight of about 120 to about 150 g/m$^2$.

In embodiments where the method of the present invention includes one or more of a porous material, masonry tiles, a veil or further particulate material, these components are also pressed to the thermoset material in the vacuum step. Preferably the process is carried out in a single vacuum step to form the product. In some examples, the vacuum step can form the final product without further machining or other finishing steps being required.

It will be appreciated that one or more of the various layers applied to the thermoset material as described herein may be applied in any desired combination and arrangement prior to the vacuum step.

For example, particulate material may be placed between the mould and the thermoset material such that the particulate material provides a surface effect on the moulded face of the thermoset material. In such embodiments a different porous material such as a foam substrate may be provided on the rear surface of the thermoset material so that a composite is produced comprising a surface effect bonded to one side of the thermoset material and a foam substrate bonded to the other side. It will be appreciated that any surface effect, such as a veil or masonry tiles may be combined with the thermoset material and a porous substrate in this way.

In some preferred embodiments, the process of the present invention further comprises incorporating the moulded thermoset material into an article. For example, a moulded polymer skin produced from the thermoset material may be subsequently attached to a substrate to form an article having a surface effect.

In some embodiments, a second mould comprising an elastomeric material as described herein may be applied to a second surface of the sheet of thermoset material opposite the side contacting the first mould, before the vacuum step.

The second mould may, in some instances, be a non-elastomeric mould.

In this way, both surfaces of the thermoset material may be moulded in one step.

It will be appreciated that the second mould may be the same as the first mould or may apply a different moulding pattern.

In some embodiments a second mould may be placed so as to mould a second sheet of thermoset material applied to a substrate, for example a foam substrate, where first and second sheets of thermoset material are applied to opposing sides of the substrate along with the first and second moulds.

Where a flat surface is desired on the surface of the thermoset material opposite the moulded surface, the thermoset material may be placed on a flat surface with the mould placed on top prior to the vacuum forming step.

In some preferred embodiments, the surface behind the thermoset material may be shaped so as to provide a shaped product during the vacuum step. For example, the thermoset material and the mould may be provided on a shaped substrate or template, where the thermoset material and the mould conform to the shape of the substrate during the vacuum step. By providing an elastomeric mould, the same mould may be used with different substrates having different shapes, avoiding the need for a new mould for each different shape.

In some embodiments, a second mould may be provided adjacent the shaped surface, with the thermoset material and the first mould placed on top. By using elastomeric moulds, both moulds and the thermoset material may conform to the overall shape of the shaped surface during the vacuum step.

It will be appreciated that, due to the flexibility of an elastomeric mould, the shaped surface may be adjacent the thermoset material surface or adjacent the mould surface. For example, a mould may be placed on the surface of a shaped substrate, with the thermoset material placed on the mould. In this way, the thermoset material would be shaped by the substrate and moulded by the mould, without bonding to the substrate.

Where a shaped or flat substrate is used adjacent the thermoset material and the thermoset material would usually bond to the substrate, a microperforated sheet may be used between the thermoset material and the substrate such that gas can pass through the microperforated sheet, but the thermoset material cannot. In this way, a skin comprising the cured thermoset material may be formed having the shape of a substrate but without bonding to the substrate.

This may be advantageous, even in the case of a flat substrate, as where a porous substrate is used gas may still be removed from the region where the components are forced together without forming a bond between the thermoset material and the substrate.

A further aspect of the present invention provides a start-up process for moulding a thermoset material, wherein the process comprises the following steps:
(i) providing a pattern;
(ii) providing an uncured elastomeric material and placing the uncured elastomeric material into contact with a surface of the pattern;
(iii) allowing the uncured elastomeric material to cure so as to form a mould comprising elastomeric material;
(iv) placing a sheet of thermoset material into contact with a surface of the mould;
(v) applying a vacuum such that the sheet of thermoset material is forced against the surface of the mould, and such that the sheet of thermoset material is caused to cure.

It will be appreciated that the process of this aspect may be substantially as described previously herein.

Thus, a mould comprising elastomeric material may be produced relatively easily from a desired pattern and advantageously used to provide the pattern to a moulded thermoset material using a vacuum. In this way, realistic replication of surfaces may be achieved in moulded articles without the need for expensive specially shaped moulds for a conventional press, for example moulds comprising metals such as aluminium or stainless steel.

A further aspect of the present invention provides a production process for forming moulded thermoset materials, wherein the process comprises the following steps:
(i) providing a mould for moulding a sheet of thermoset material, wherein the mould comprises an elastomeric material;
(ii) providing a first shaped substrate;
(iii) placing a surface of a first sheet of a phenolic thermoset material into contact with a surface of the mould and placing the first sheet of phenolic thermoset material and the mould on the first shaped substrate;

(iv) applying a vacuum such that the first sheet of thermoset material is forced against the surface of the mould, and such that the first sheet of thermoset material and the mould conform to the shape of the first shaped substrate and the first sheet of thermoset material is at least partially cured;
(v) providing a second sheet of a phenolic thermoset material, and providing a second shaped substrate, different from the first shaped substrate; and
(vi) repeating steps (iii) and (iv) using the mould from part (i) and the second sheet of a phenolic thermoset material and the second shaped substrate from part (v).

Thus, the same mould may be re-used with multiple different shaped substrates, whereas conventionally, a new mould would be required each time. It is typically much easier to produce a shaped substrate than it is to produce a new shaped mould, and so the process may substantially reduce the costs of providing a variety of shaped and moulded products.

It will be appreciated that the individual steps of the production process of this aspect may be substantially as described previously herein.

A further aspect of the present invention provides a vacuum forming process for moulding a thermoset material, wherein the process comprises the following steps:
(i) providing a mould for moulding a sheet of thermoset material, wherein the mould comprises an elastomeric material;
(ii) placing a sheet of SMC into contact with a surface of the mould;
(iii) applying a vacuum such that the sheet of thermoset material is forced against the surface of the mould, and such that the sheet of thermoset material is at least partially cured;
wherein the sheet of SMC is pre-treated prior to step (iii) with a viscosity controlling agent such that the SMC sheet at least partially absorbs the viscosity controlling agent.

Surprisingly, by pre-treating the sheet of SMC with a viscosity controlling agent such that the SMC at least partially absorbs the viscosity controlling agent, SMC may be used in combination with an elastomeric mould in a vacuum forming process. The quality of the moulding is improved by the pre-treatment step, as typically SMC materials would require greater pressures than are possible by vacuum forming to allow effecting moulding.

Without wishing to be bound by any particular theory, it is believed that by pre-treating the SMC with a viscosity controlling agent, the sheet is softened to the extent that a vacuum forming process using an elastomeric mould may be performed.

Preferably, the viscosity controlling agent is selected from one or more of butanol, chloroform, ethanol, water, acetonitrile, hexane, and isopropyl alcohol, preferably water.

The pre-treatment may be carried out by any suitable method. For example, the pre-treatment may comprise soaking the SMC sheet in the viscosity controlling agent or applying the viscosity controlling agent to the sheet by spraying.

The amount of time for which the pre-treatment is carried out may depend on the precise nature of the SMC and the viscosity controlling agent. It will be appreciated that the amount of time will be selected such that the SMC sheet is sufficiently softened as required for the vacuum forming process.

The SMC (sheet moulding compound) comprises a thermosetting resin, preferably a polyester resin, together with reinforcing fibres, preferably glass fibres. There are some benefits in using SMC. For example, SMC has low density and favourable mechanical properties compared with other materials (for example thermoplastics), and also exhibits good thermal properties. Of particular importance for some applications, for example building applications, resistance to fire is good. SMC also shows good noise reduction qualities, also important where used as a building material and good chemical resistance.

The SMC may comprise two main components: a matrix and fibres. The SMC matrix preferably comprises a resin which preferably includes polyester, but may include vinyl ester, epoxy, or a polyimide. Preferably the matrix comprises a thermosetting resin. The SMC matrix may further comprise additives, for example minerals, inert fillers, pigments, stabilizers, inhibitors, release agents, catalysts, thickeners, hydrating additives and/or other suitable materials. Suitable fibres are discussed above.

A further aspect of the present invention provides an article comprising moulded thermoset material produced by a process substantially as described previously herein.

A further aspect of the present invention provides a kit of parts comprising:
(i) a mould comprising an elastomeric material;
(ii) a shaped substrate; and
(iii) means for applying a vacuum to force the mould against the surface of the shaped substrate such that a sheet of thermoset material may be moulded between the mould and the shaped substrate.

It will be appreciated that the elastomeric material and/or the mould may be substantially as described previously herein.

In preferred embodiments, the shaped substrate comprises a layer of porous material substantially as defined previously herein.

A further aspect of the invention provides use of a process substantially as described previously herein to produce an article comprising moulded thermoset material.

The present invention will now be described by way of example, with reference to the accompanying drawings, in which.

Figure 1:
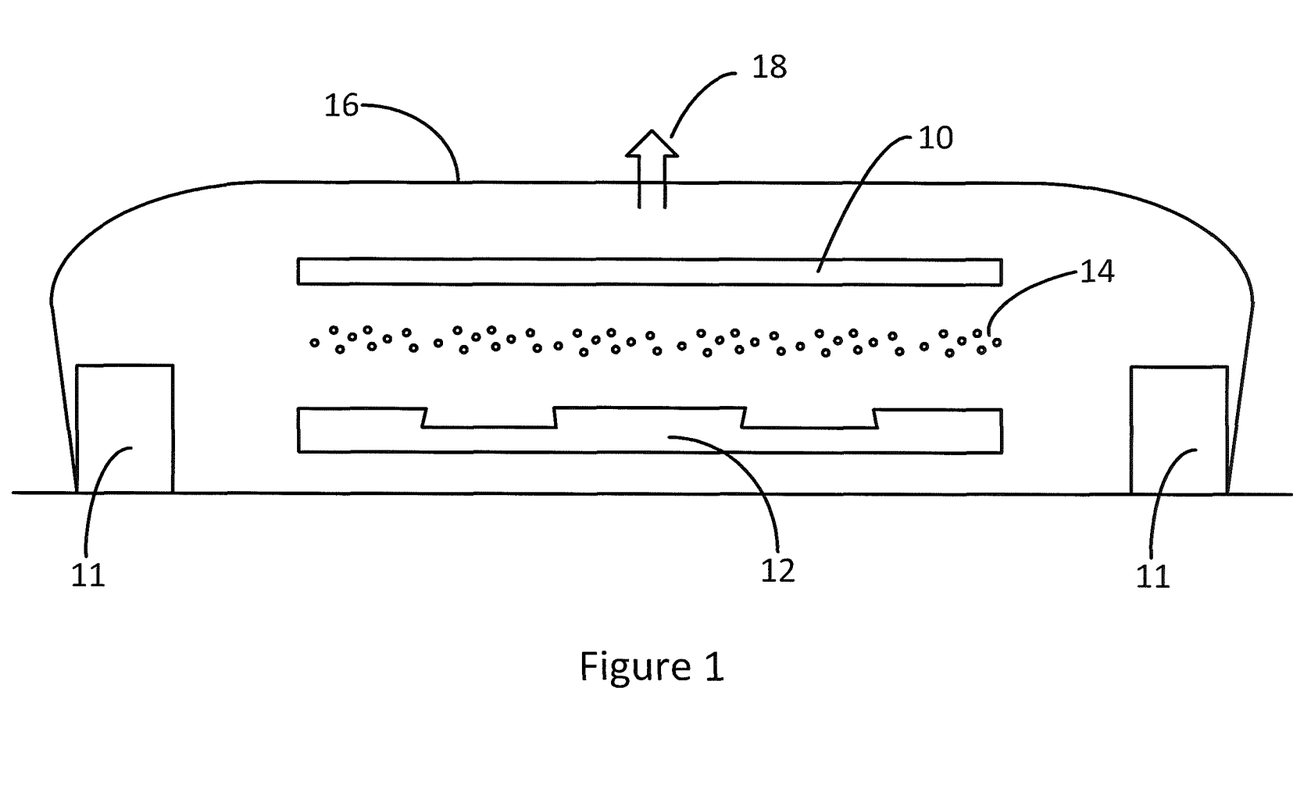
FIG. 1 shows a schematic cross-sectional view of an arrangement of components including a particulate material in the process of the present invention.

FIG. 1 shows a schematic cross-sectional view of an arrangement of a thermoset material 10 and a mould 12. In this example, particulate material 14 is provided between the mould 12 and the thermoset material 10, however such particulate material may not be required.

A frame 11 is provided around the components and a sheet of flexible material 16, for example a vacuum bag, is attached to the frame 11. A vacuum is created by withdrawing air via an outlet 18, for example using a vacuum pump.

Figure 2:
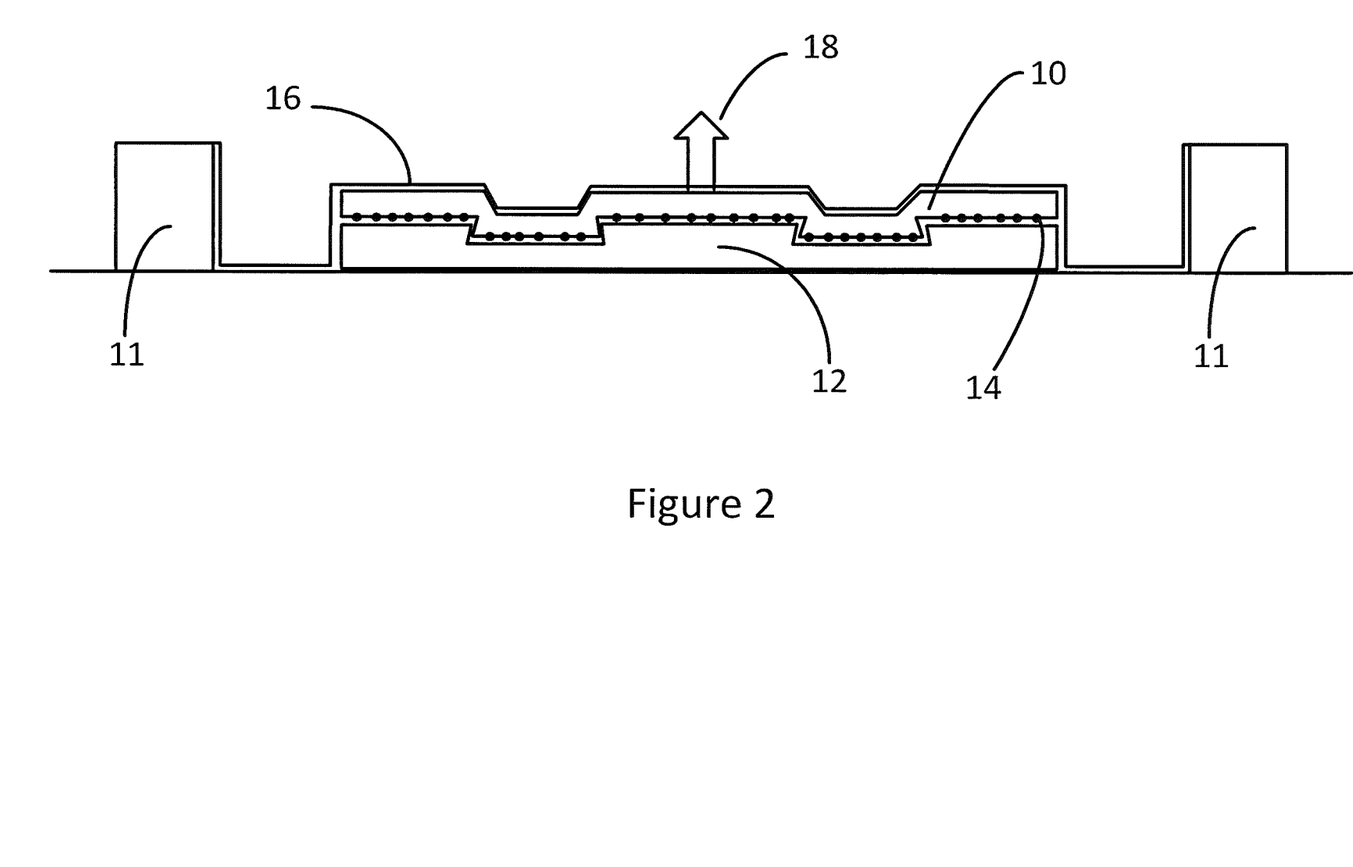
FIG. 2 shows a schematic cross-sectional view of the arrangement of FIG. 1 after vacuum is applied.

As shown in FIG. 2, when a vacuum is applied the mould 12, the thermoset material 10, and in this case the particulate material 14, are forced together by the sheet 16 as a result of the applied vacuum via outlet 18.

As shown in FIGS. 1 and 2, the mould has an undercut in its shape. The use of an elastomeric mould 12 allows the moulded and cured thermoset material to be removed from the mould more easily after the moulding step.

The particulate material 14 is embedded in the surface of the thermoset material 10 during the vacuum step. It will be appreciated that in various examples, the particulate material 14 may only be applied to certain areas of the mould or thermoset material 10 or different particulate materials may be applied to different areas.

Figure 3:
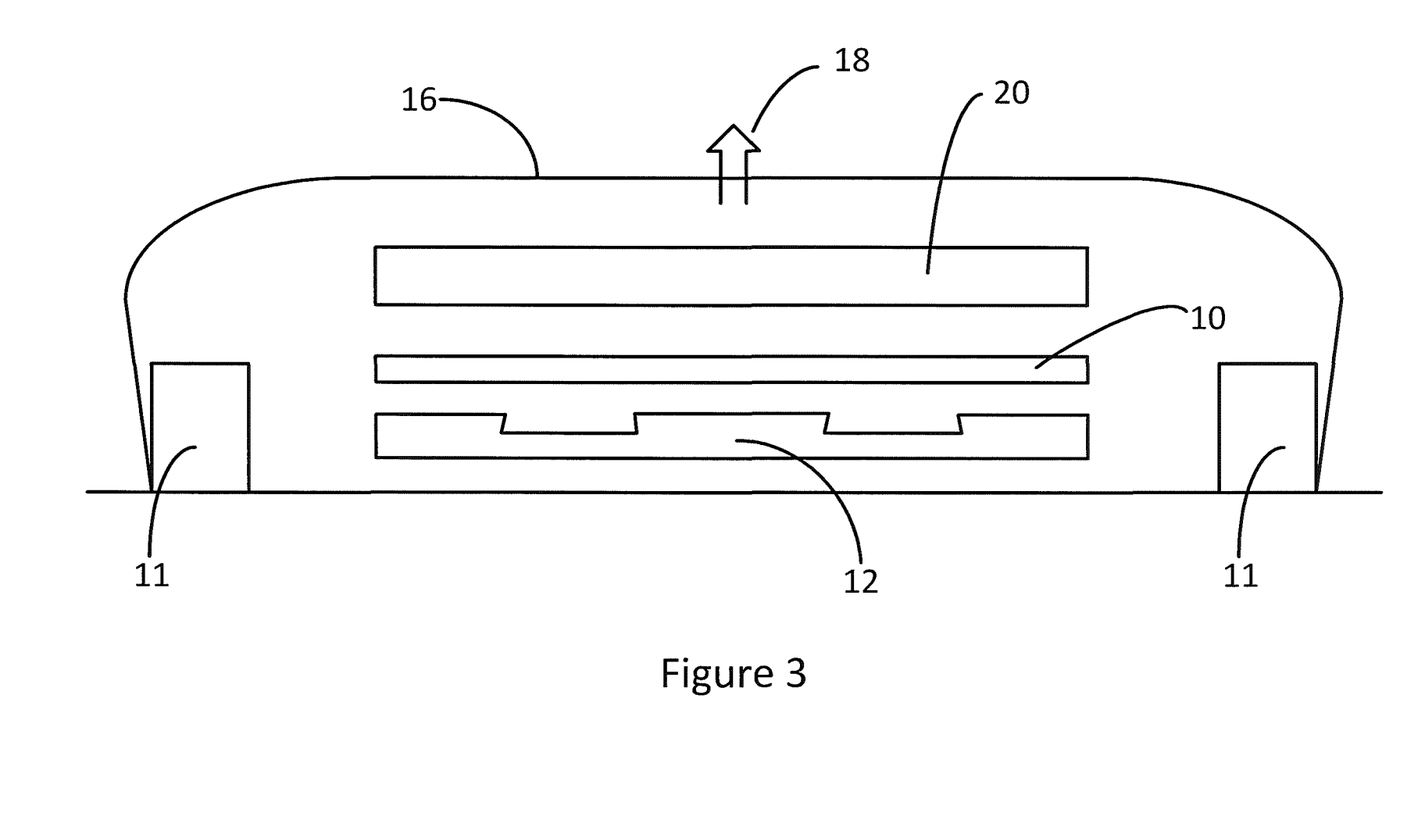
FIG. 3 shows a schematic cross-sectional view of an arrangement of components including a foam substrate in the process of the present invention.

FIG. 3 shows an arrangement where a foam substrate 20 is arranged on the rear surface of the thermoset material 10 opposite the surface facing the mould 12. A vacuum may be applied as shown in FIG. 2 to produce a composite having a moulded surface formed from the cured thermoset material, where the thermoset material is bonded to the foam substrate 20 on the opposing side.

Figure 4:
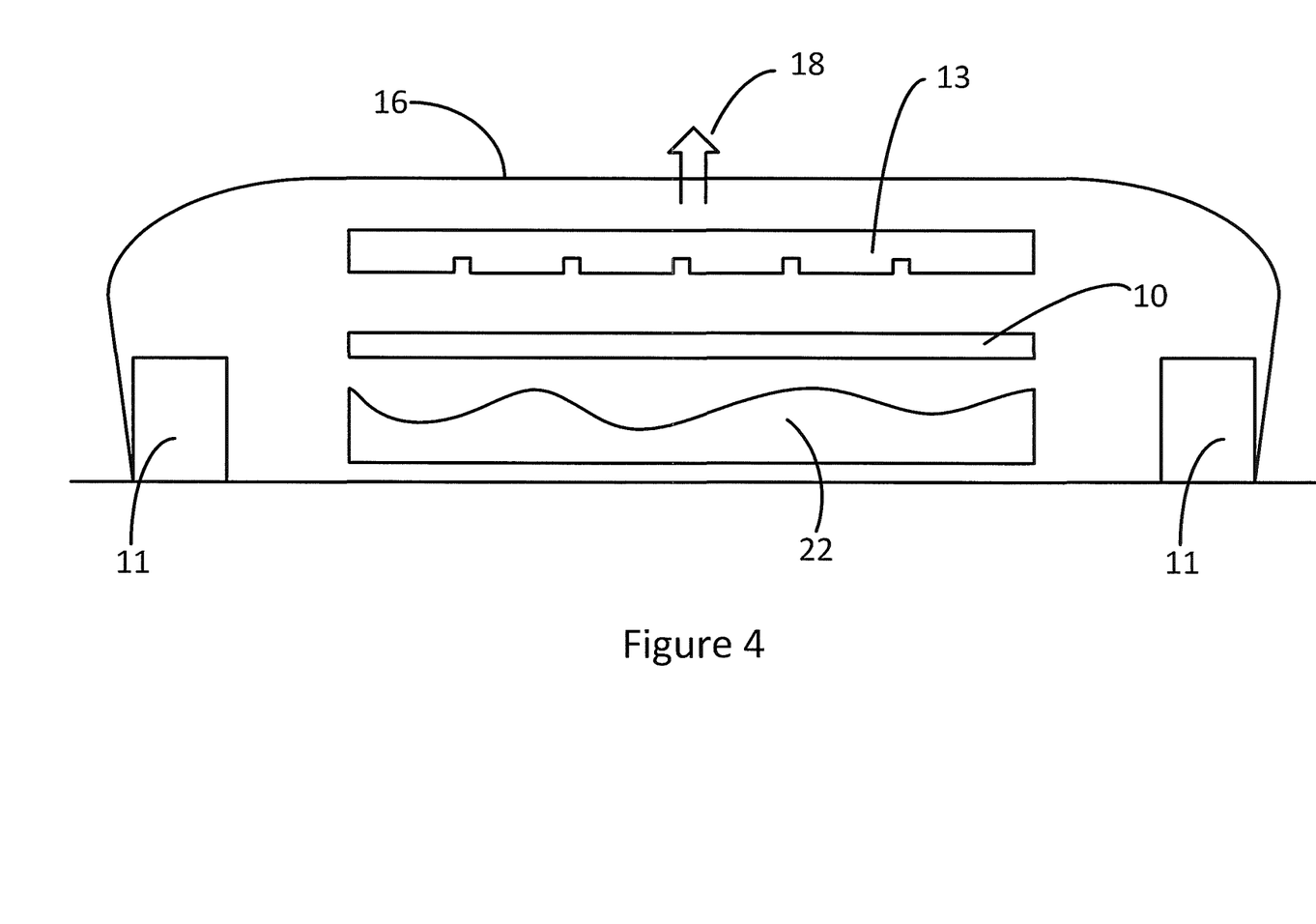
FIG. 4 shows a schematic cross-sectional view of an arrangement of components including a shaped foam substrate in the process of the present invention.

FIG. 4 shows another arrangement where a mould 13 is arranged over a thermoset material 10 and a shaped foam substrate 22 is provided on the rear surface of the thermoset material 10. Although a different mould shape 13 is shown in FIG. 4, this is purely by way of example and it will be appreciated that any suitable mould shape may be used, for example a mould having undercut such as is shown in FIGS. 1 to 3. A vacuum may be applied as shown in FIG. 2 to produce a moulded and cured thermoset that this shaped to the contours of and bonded to the foam substrate.

Although no particulate material is shown in FIG. 3 or FIG. 4, it will be appreciated that particulate material or other surface effects as described herein may also be included in these examples.

With reference to the embodiments of FIGS. 1 to 4, as described herein, the thermoset material, the mould, the foam substrate or the particulate material may be heated prior to the vacuum step to induce curing of the thermoset material and to allow flow of the thermoset material around the particulate material 14 or into pores of the foam substrate 20, 22. The heating may also be conducted during the vacuum step as described herein.

It will be appreciated that the accompanying Figures are only illustrative and the relative scale of the components may be different in practice.

Figure 5:
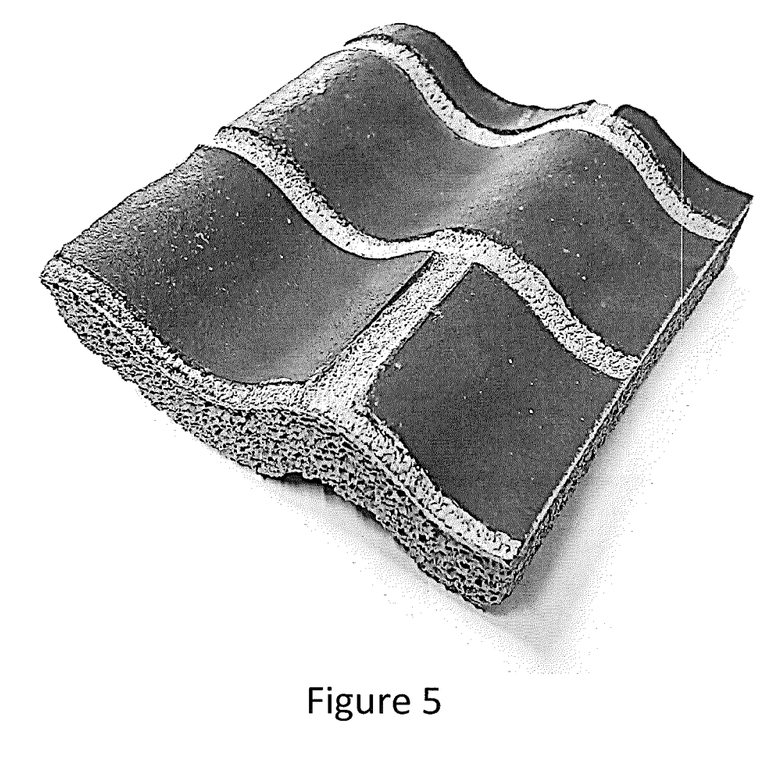
FIG. 5 shows a photograph of part of a composite produced in accordance with the vacuum forming process of the present invention.

FIG. 5 shows a photograph of a composite produced by a vacuum forming process in accordance with the present invention. The composite comprises a thermoset material bonded to a foam substrate, where the thermoset material has been moulded to have a brick pattern by an elastomeric mould during the vacuum moulding process. The substrate has a profiled surface and the thermoset material and the mould have adapted to the shape of the substrate to produce a moulded pattern across the surface of the thermoset material, which conforms to the uneven surface of the substrate. It will be appreciated that the same mould could be re-used with other different shaped substrates without requiring a new mould to be provided each time.

The invention claimed is:

1. A vacuum forming process for molding a thermoset material, wherein the process comprises the following steps: (i) providing a mold for molding a sheet of a phenolic thermoset material, wherein the mold comprises an elastomeric material; (ii) placing the sheet of the phenolic thermoset material into contact with a surface of the mold; (iii) applying a vacuum to force the sheet of the phenolic thermoset material against the surface of the mold, and to at least partially cure the sheet of the phenolic thermoset material; and further wherein the phenolic thermoset material comprises: uncured phenolic resin; filler; and a catalyst in an amount of less than 2 wt. % relative to the content of phenolic resin, wherein the filler is present in a ratio of the filler to the uncured phenolic resin in an amount of 2.5:1 or greater, and further wherein the filler comprises a transition metal hydroxide and/or aluminum hydroxide in a ratio of the transition metal hydroxide and/or the aluminum hydroxide to the uncured phenolic resin in an amount of 1:1.5 to 3:1.

2. A process according to claim 1, wherein the catalyst is present in an amount of less than 1 wt. % relative to the content of the uncured phenolic resin.

3. A process according to claim 1, wherein the transition metal hydroxide and/or aluminum hydroxide are of formula $M(OH)_3$, wherein M is a metal.

4. A process according to claim 1, wherein the elastomeric material comprises a natural or synthetic rubber.

5. A process according to claim 1, further comprising heating the sheet of thermoset material before the step of applying vacuum; or further comprising heating the elastomeric mold material before the step of applying vacuum.

6. A process according to claim 1, wherein the sheet of thermoset material is heated to a temperature of at least 50° C.

7. A process according to claim 1, wherein the step of applying a vacuum comprises applying a pressure of at least 0.5 bar but less than 1 bar.

8. A process according to claim 1, wherein the vacuum is created by use of a vacuum bag.

9. A process according to claim 1, wherein a layer of porous material is provided adjacent to a surface of the sheet of thermoset material that is not in contact with the mold.

10. A process according to claim 9, wherein the porous material comprises a foam.

11. A process according to claim 9, wherein the porous material is particulate in nature.

12. A process according to claim 9, wherein at least a part of the layer of the porous material remains adhered to the sheet of thermoset material after the step of applying vacuum.

13. A process according to claim 1, wherein at least a part of the surface of the mold is coated with a dye, paint or ink, and wherein the step of applying vacuum causes the dye, paint or ink to be applied onto a surface of the sheet of thermoset material.

14. A process according to claim 1, wherein the mold has a specific shape such that the sheet of thermoset material is molded into a specific shape upon application of a vacuum.

* * * * *

UNITED STATES PATENT AND TRADEMARK OFFICE
CERTIFICATE OF CORRECTION

| | | |
|---|---|---|
| PATENT NO. | : 12,202,189 B2 | Page 1 of 1 |
| APPLICATION NO. | : 17/059819 | |
| DATED | : January 21, 2025 | |
| INVENTOR(S) | : Aldino Albertelli and Roberto Zedda | |

It is certified that error appears in the above-identified patent and that said Letters Patent is hereby corrected as shown below:

On the Title Page

Item (71) Applicant, please change, "Aldino Albertelli, Dublin (IE); Roberto Zedda, Dublin (IE)" to --Acell Industries Limited, Dublin (IE)--.

Signed and Sealed this
Twelfth Day of August, 2025

Coke Morgan Stewart
*Acting Director of the United States Patent and Trademark Office*